(12) United States Patent
Fujiwara et al.

(10) Patent No.: US 11,526,315 B2
(45) Date of Patent: Dec. 13, 2022

(54) IMAGE PROCESSING APPARATUS CONFIGURED TO ENCODE IDENTIFICATION INFORMATION ABOUT A PACKAGE FOR DELIVERY

(71) Applicant: TOSHIBA TEC KABUSHIKI KAISHA, Tokyo (JP)

(72) Inventors: Akihiko Fujiwara, Kawasaki Kanagawa (JP); Koji Nagai, Tokyo (JP); Shigeo Uchida, Mishima Shizuoka (JP); Masateru Mitani, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/461,784

(22) Filed: Aug. 30, 2021

(65) Prior Publication Data

US 2021/0389916 A1 Dec. 16, 2021

Related U.S. Application Data

(63) Continuation of application No. 16/933,884, filed on Jul. 20, 2020, which is a continuation of application No. 16/298,780, filed on Mar. 11, 2019, now Pat. No. 10,732,912.

(30) Foreign Application Priority Data

Apr. 19, 2018 (JP) .............................. JP2018-080567

(51) Int. Cl.
*G06F 3/12* (2006.01)
*G06F 21/60* (2013.01)

(52) U.S. Cl.
CPC .......... *G06F 3/1238* (2013.01); *G06F 3/1222* (2013.01); *G06F 21/608* (2013.01)

(58) Field of Classification Search
CPC ...................................... G06F 3/1238
USPC ........................................... 358/1.15
See application file for complete search history.

(56) References Cited

U.S. PATENT DOCUMENTS

| 2004/0211834 A1 | 10/2004 | Fleckenstein et al. |
| 2007/0177824 A1* | 8/2007 | Cattrone ................ G06F 16/93 707/E17.008 |
| 2007/0220614 A1* | 9/2007 | Ellis ...................... G06F 21/645 726/27 |
| 2011/0255111 A1 | 10/2011 | Oba et al. |
| 2013/0070305 A1 | 3/2013 | Tomizawa et al. |

(Continued)

FOREIGN PATENT DOCUMENTS

JP 2006-198889 A 8/2006

*Primary Examiner* — Jacky X Zheng

(74) *Attorney, Agent, or Firm* — Kim & Stewart LLP

(57) ABSTRACT

An image processing apparatus includes a display, an input device, and a processor configured to accept, through the input device, a user input of identification information about a package for delivery, acquire information about a plurality of document types used in a delivery service, generate a screen displayed on the display, the screen showing a preview of a print image for each of the document types, upon selection of a previewed print image, encode the identification information into a code, and output the selected print image together with the code for printing. The previewed print image includes a signature field and a code field in which the code is to be printed.

19 Claims, 5 Drawing Sheets

(56) References Cited

U.S. PATENT DOCUMENTS

| | | | |
|---|---|---|---|
| 2014/0240735 A1* | 8/2014 | Salgado | G06K 15/1815 358/1.13 |
| 2014/0268220 A1 | 9/2014 | Yuki | |
| 2016/0171298 A1 | 6/2016 | Takeda et al. | |

* cited by examiner

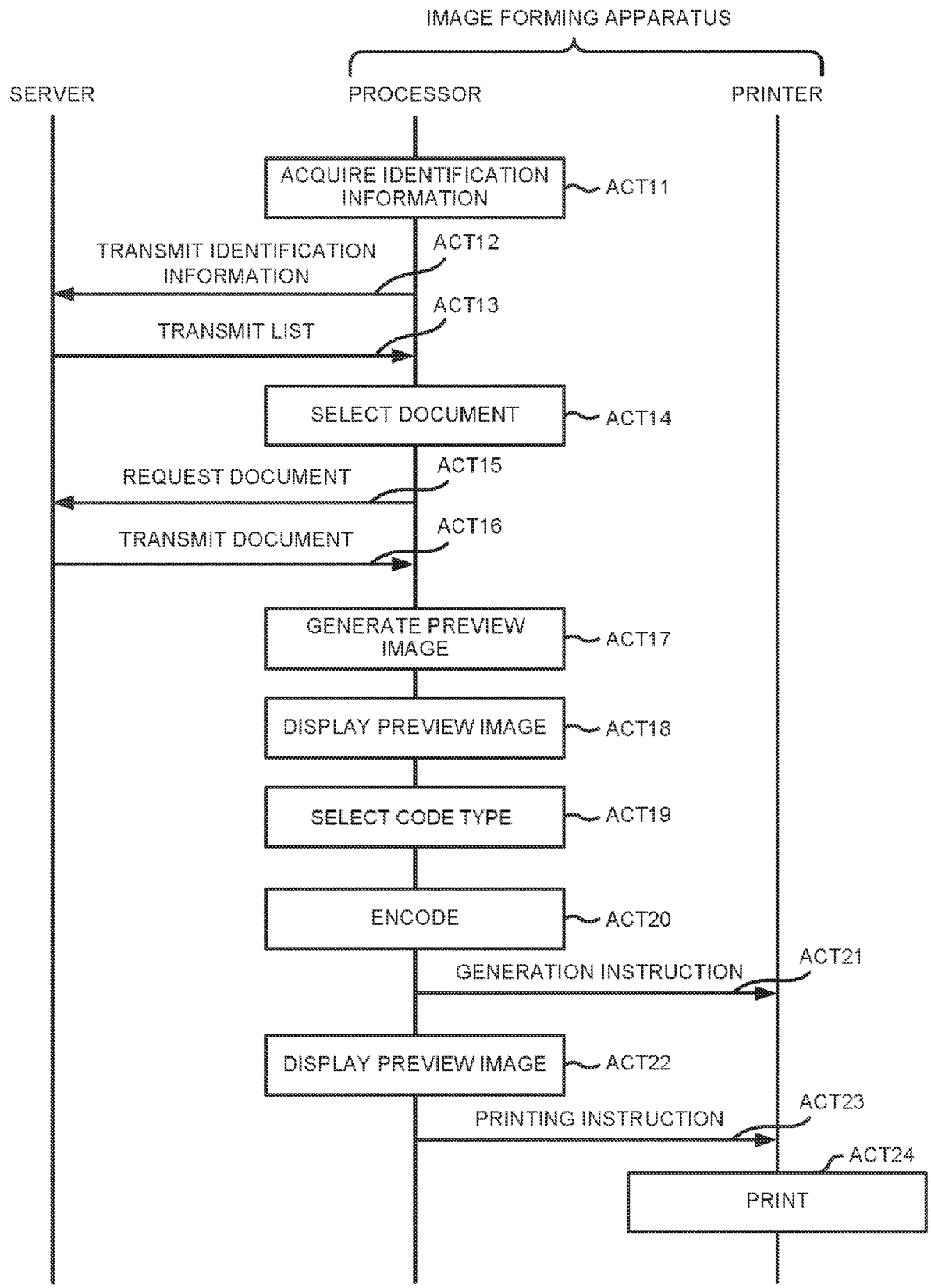

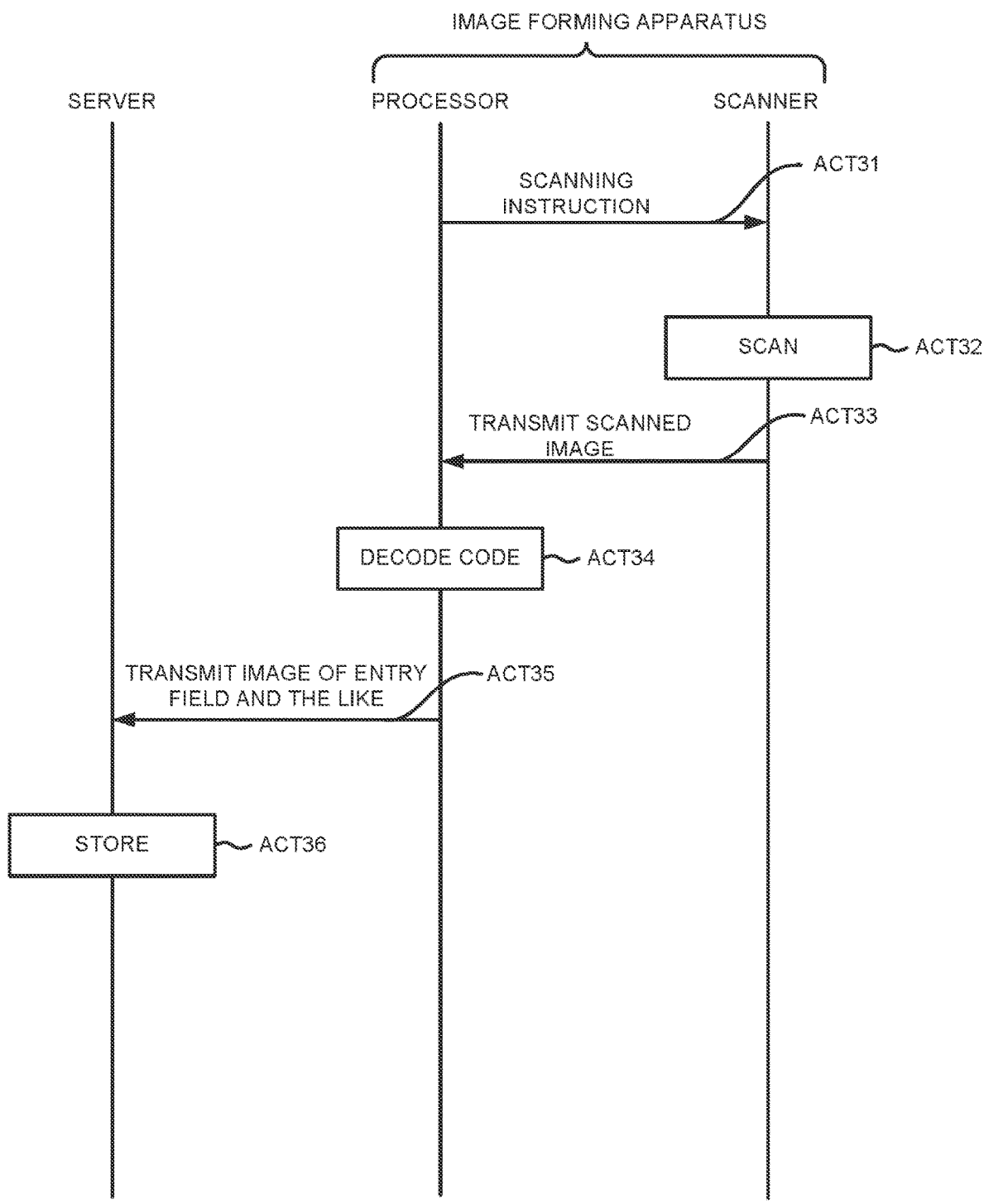

IMAGE PROCESSING APPARATUS CONFIGURED TO ENCODE IDENTIFICATION INFORMATION ABOUT A PACKAGE FOR DELIVERY

CROSS-REFERENCE TO RELATED APPLICATION

This application is a continuation of U.S. patent application Ser. No. 16/933,884, filed Jul. 20, 2020, which is a continuation of U.S. patent application Ser. No. 16/298,780, filed Mar. 11, 2019, now U.S. Pat. No. 10,732,912, issued on Aug. 4, 2020, which is based upon and claims the benefit of priority from Japanese Patent Application No. 2018-080567, filed Apr. 19, 2018, the entire contents of which are incorporated herein by reference.

FIELD

Embodiments described herein relate generally to an image processing apparatus and an image forming method.

BACKGROUND

An image forming apparatus is used to print a document relating to a predetermined service. Such an image forming apparatus prints a document of a certain type in response to an operation from an operator.

There is a problem that the printed document often does not contain sufficient information to specify what task of the predetermined service the printed document relates to.

DESCRIPTION OF THE DRAWINGS

FIG. 5 is a sequence diagram illustrating a process performed by the management system according to the embodiment; and FIG. 6 is a sequence diagram illustrating a process performed by the management system according to the embodiment.

DETAILED DESCRIPTION

In accordance with an embodiment, an image processing apparatus includes a display, an input device, and a processor configured to accept, through the input device, a user input of identification information about a package for delivery, acquire information about a plurality of document types used in a delivery service, generate a screen displayed on the display, the screen showing a preview of a print image for each of the document types, upon selection of a previewed print image, encode the identification information into a code, and output the selected print image together with the code for printing. The previewed print image includes a signature field and a code field in which the code is to be printed.

Hereinafter, an embodiment is described with reference to the accompanying drawings.

A management system according to the embodiment manages an image of an entry field of a document relating to a predetermined service. For example, the management system manages the image of the entry field of the document relating to a delivery work as a service. For example, the management system manages an image of a signature recorded in the entry field when a consignee receives a package. The management system stores the image of the signature and identification information for specifying a task of the delivery service in an associated manner in a predetermined memory or the like.

For example, the management system is installed in an enterprise that provides a delivery work. The service and an installation location of the management system are not limited.

Figure 1:
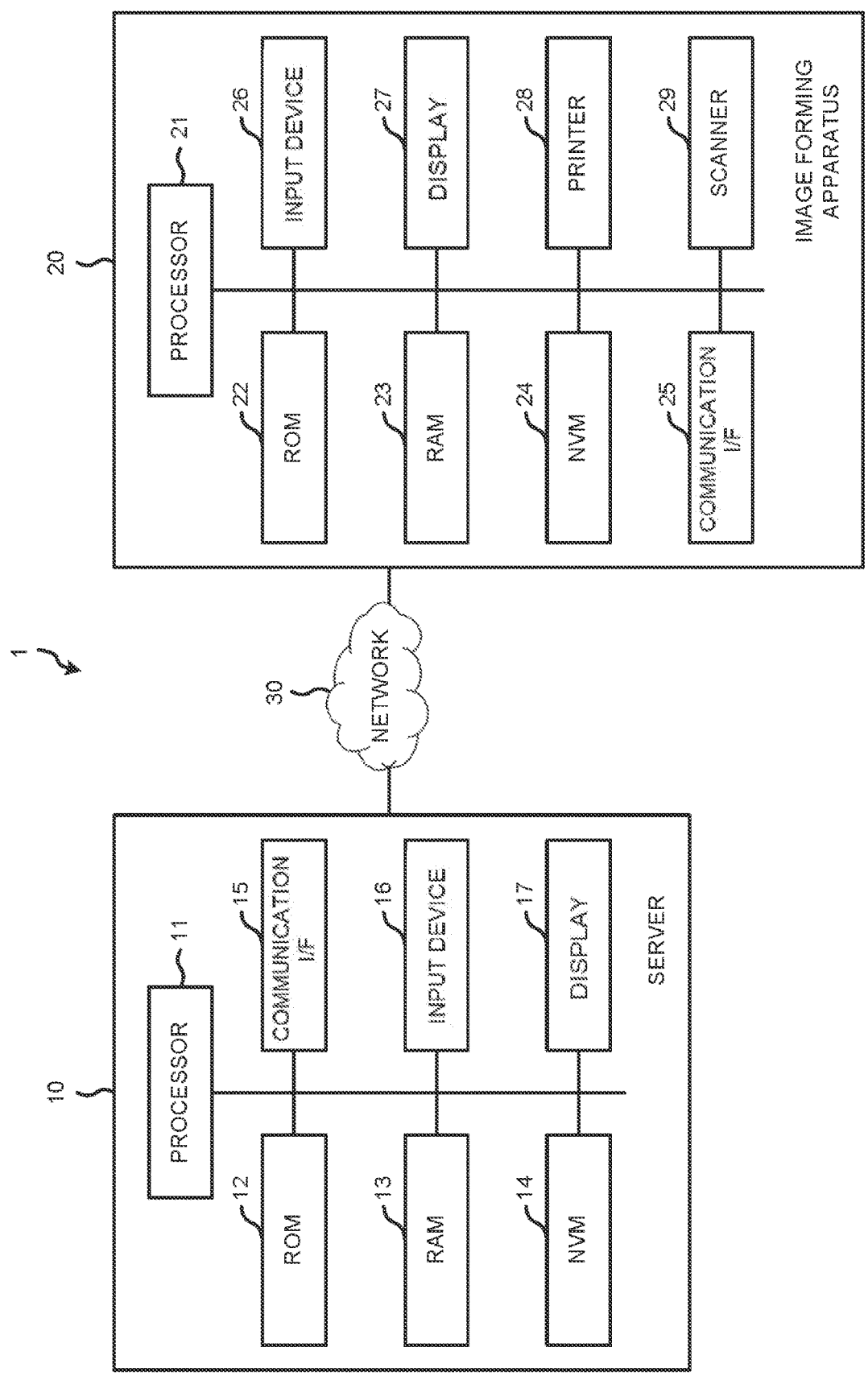
FIG. 1 is a block diagram illustrating a management system according to an embodiment.

FIG. 1 shows a configuration of a management system 1 according to the embodiment. As shown in FIG. 1, the management system 1 comprises a server 10, an image forming apparatus 20 and a network 30. The server 10 and the image forming apparatus are connected to the network 30, respectively. The management system 1 may further have a component as required in addition to the above components shown in FIG. 1, or may exclude a specific component from the management system 1.

The server 10 manages data of a document relating to a predetermined service. The server 10 transmits the document data to the image forming apparatus 20. The server 10 manages an image of a signature or the like recorded in the entry field of the document. Specifically, the server 10 stores the identification information for specifying a task and the image of the signature or the like relating to the task in an associated manner.

Next, an example of a configuration of the server 10 is described.

As shown in FIG. 1, the server 10 includes a processor 11, a ROM (Read Only Memory) 12, a RAM (Random Access Memory) 13, an NVM (Non-Volatile Memory) 14, a communication interface (I/F) 15, an input device 16, and a display 17. These components are connected to each other via a data bus. The server 10 may further have a component as required in addition to the above components shown in FIG. 1, or may exclude a specific component from the server 10.

The processor 11 has a function of controlling the operation of the entire server 10. The processor 11 may include an internal cache, various kinds of interfaces and the like. The processor 11 performs various functions by executing programs stored in the internal memory, the ROM 12 or the NVM 14 in advance.

A part of various functions performed by the processor 11 executing the programs may be realized by a hardware circuit. In this case, the processor 11 controls functions to be executed by the hardware circuit.

The ROM 12 is a nonvolatile memory in which a control program, control data and the like are stored in advance. The control program and the control data stored in the ROM 12 are incorporated in advance according to a specification of the server 10. For example, the ROM 12 stores a program for controlling a circuit board of the server 10.

The RAM 13 is a volatile memory. The RAM 13 temporarily stores data being processed by the processor 11 and the like. The RAM 13 stores various application programs based on a command from the processor 11. The RAM 13 may store data necessary for executing the application program, an execution result of the application program, and the like.

The NVM 14 is a nonvolatile memory capable of writing and rewriting data. For example, the NVM 14 is an HDD (Hard Disk Drive), an SSD (Solid State Drive), an EEPROM® or a flash memory. The NVM 14 stores control programs, applications, various kinds of data, and the like according to an operation application of the server 10.

The NVM 14 stores data of a document relating to a service (e.g., delivery work, etc.) in advance. The document is described in detail later.

The communication I/F 15 is an interface for transmitting and receiving data to and from the image forming apparatus 20 via the network 30. The communication I/F 15 is, for example, an interface that supports LAN (Local Area Network) connection.

The input device 16 receives input of various operations from an operator. The input device 16 transmits a signal indicating the received operation to the processor 11. For example, the input device 16 is a keyboard, a numeric keypad, and a touch panel.

The display 17 displays various kinds of information under the control of the processor 11. For example, the display 17 is a liquid crystal monitor. If the input device 16 is a touch panel, the display 17 may be integrally formed with the input device 16.

The server 10 may be, for example, a desktop PC (Personal Computer) or the like.

Next, the document data stored in the NVM 14 is described. The document is used in a predetermined service. For example, the document is used by an operator who provides a service in a state in which the document is printed on a paper.

Figure 2:
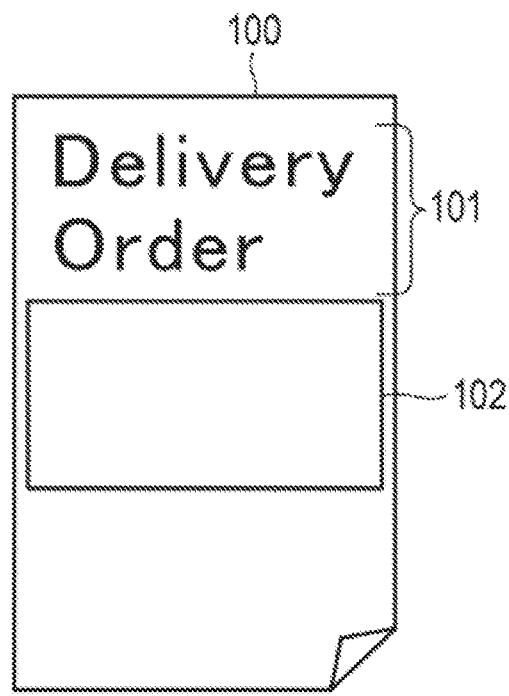
FIG. 2 is a diagram illustrating a type of document used in the embodiment.

FIG. 2 shows an example of the document. As shown in FIG. 2, a document 100 comprises an information field 101 and an entry field 102.

The information field 101 is used for displaying information relating to the service. Here, the information field 101 displays "Delivery Order". In other words, the information field 101 indicates that the document 100 is to be used in a delivery work.

The entry field 102 is an area in which predetermined information is recorded. For example, the entry field 102 is an area in which a signature of a consignee who receives the delivered package (for example, a signature for proof of reception) is recorded. The entry field 102 may be an area in which a signature of the operator who provides the delivery work is recorded. The information recorded in the entry field 102 is not limited to specific information.

The document 100 may further include an information field. The document 100 may not have the information field 101.

The document data is stored in advance in the NVM 14 in response to an operation from the operator or the like. The document data may be updated as appropriate.

The NVM 14 may store a plurality of types of documents relating to a plurality of services.

Next, an example of a configuration of the image forming apparatus 20 is described.

As shown in FIG. 1, the image forming apparatus 20 comprises a processor 21, a ROM 22, a RAM 23, an NVM 24, a communication I/F 25, an input device 26, a display 27, a printer 28 and a scanner 29. These components are connected to each other via a data bus. The image forming apparatus 20 may further have a component as required in addition to the above components shown in FIG. 1, or may exclude a specific component from the image forming apparatus 20.

The processor 21 has a function of controlling the operation of the entire image forming apparatus 20. The processor 21 may include an internal cache, various kinds of interfaces and the like. The processor 21 performs various functions by executing programs stored in the internal memory, the ROM 22 or the NVM 24 in advance.

A part of various functions performed by the processor 21 executing the programs may be realized by a hardware circuit. In this case, the processor 21 controls functions to be executed by the hardware circuit.

The ROM 22 is a nonvolatile memory in which a control program, control data and the like are stored in advance. The control program and the control data stored in the ROM 22 are incorporated in advance according to a specification of the image forming apparatus 20. For example, the ROM 22 stores a program for controlling a circuit board of the image forming apparatus 20.

The RAM 23 is a volatile memory. The RAM 23 temporarily stores data being processed by the processor 21 and the like. The RAM 23 stores various application programs based on a command from the processor 21. The RAM 23 may store data necessary for executing the application program, an execution result of the application program, and the like.

The NVM 24 is a nonvolatile memory capable of writing and rewriting data. For example, the NVM 24 is an HDD, an SSD, an EEPROM or a flash memory. The NVM 14 stores control programs, applications, various kinds of data, and the like according to an operation application of the image forming apparatus 20.

The NVM 24 stores a template for printing a code obtained by encoding the identification information on the document in a superposed manner. The template indicates code information including at least one of an encoding format of the code, a position of the code on the document, a size of the code to be printed, and the like.

The NVM 24 stores a plurality of templates. The template may be appropriately updated.

The communication I/F 25 is an interface for transmitting and receiving data to and from the server 10 via the network 30. The communication I/F 25 is, for example, an interface that supports LAN connection.

The input device 26 receives input of various operations from an operator. The input device 26 transmits a signal indicating the received operation to the processor 21. For example, the input device 26 is a keyboard, a numeric keypad, and a touch panel.

The display 27 displays various kinds of information under the control of the processor 21. For example, the display 27 is a liquid crystal monitor. If the input device 26 is the touch panel, the display 27 may be integrally formed with the input device 26.

Herein, the input device 26 and the display 27 are integrated into a control panel.

The printer 28 prints an image on a sheet of paper based on a signal from the processor 21. For example, the printer 28 includes a supply unit for supplying the paper and a printing unit for printing an image on the paper.

The printer 28 takes out the paper from the supply unit to convey it to the printing unit. The printer 28 forms an image on a paper using the printing unit. For example, the printing unit forms an image on the paper using an inkjet method or an electrophotographic method. The configuration of the printer 28 is not limited to a specific configuration.

The printer 28 includes a RIP (Raster Image Processor). The RIP is used to generate a raster image. For example, the RIP generates a raster image to be printed according to a signal from the processor 21. The RIP generates the raster image by printing a plurality of images in a synthesized manner according to the signal from the processor 21.

The scanner 29 scans the area where the document is placed (for example, a document table). The scanner 29 generates a scanned image. The scanner 29 transmits the scanned image to the processor 21.

The scanner 29 is a sensor having a plurality of reading pixels (for example, photoelectric conversion elements) in a main scanning direction. The scanner 29 moves the sensor in a sub-scanning direction orthogonal to the main scanning direction. The scanner 29 reads the document on the document table by moving the sensor in the sub-scanning direction. The scanner 29 may include an illumination for irradiating the document.

The scanner 29 may read the document by moving the document in the sub-scanning direction.

The configuration of the scanner 29 is not limited to a specific configuration.

The network 30 is a communication network for connecting the server 10 and the image forming apparatus 20 to each other. The network 30 may be any type of network. For example, the network 30 may be a LAN (Local Area Network). The network 30 may be the Internet.

Next, the function realized by the image forming apparatus 20 is described. The function of the image forming apparatus 20 is realized by the processor 21 executing a program stored in the ROM 22 or the NVM 24.

First, the processor 21 has a function of acquiring the identification information for specifying a task in the predetermined service.

The identification information specifies an individual task. For example, if the service is a delivery work, the identification information indicates a task of delivering a predetermined object. Specifically, the identification information specifies a series of works from shipment to delivery for a specific package.

For example, the identification information may be a character string, a numeric value, a symbol or a combination thereof. The identification information may be a code obtained by encoding the information for specifying individual tasks. For example, the identification information may be a one-dimensional code (barcode) or a two-dimensional code (for example, QR Code®).

The processor 21 controls the input device 26 to receive the input of the identification information. For example, the operator inputs the identification information of the task that he or she takes charge of to the input device 26. The processor 21 acquires the input identification information.

The processor 21 may acquire the identification information from an external device. For example, the processor 21 acquires the predetermined identification information of the task that the operator takes charge of from the external device.

The processor 21 has a function of acquiring information about a document type relating to the service of the task indicated by the acquired identification information.

The processor 21 controls the communication I/F 25 to transmit a request for storing the identification information to the server 10. The processor 21 controls the communication I/F 25 to receive a response to store data of the document relating to the service of the task specified by the identification information. For example, in a case of acquiring the identification information indicating the task of the delivery work, the processor 21 acquires data of the document relating to the delivery work.

If the server 10 stores information about a plurality of types of documents relating to the service, the processor 21 controls the communication I/F 25 to receive a response for storing a list of the plurality of types of documents relating to the service. If the response for storing the list is received, the processor 21 controls the display 27 to display the list to receive the selection of one of the types of documents.

The processor 21 controls the communication I/F 25 to send a request for requesting the selected type of document to the server 10. The processor 21 controls the communication I/F 25 to receive a response for storing the selected type of document.

The processor 21 has a function of selecting a template for printing the identification information.

If the NVM 24 stores one template, the processor 21 selects the template.

If the NVM 24 stores a plurality of templates, the processor 21 generates a preview image in which a code is added to the document according to the template. The processor 21 generates a preview image according to each template in response to an operation by an operator.

If the preview image is generated, the processor 21 controls the input device 26 to receive the selection of one of the templates from the operator. The processor 21 selects the template according to the operation of the operator.

The processor 21 may automatically select the template according to the document.

The processor 21 has a function of encoding the obtained identification information to a code.

The processor 21 encodes the identification information according to the selected template. Specifically, the processor generates the code by encoding the identification information according to an encoding format indicated by the template.

If the template does not indicate the encoding format, the processor 21 may generate the code by encoding the identification information according to a predetermined encoding format.

For example, the code is a one-dimensional code such as a JAN (Japanese Article Number) code. The code may be a UPC (Universal Product Code) or an EAN (European Article Number) code. The code may be a two-dimensional code such as a QR code. The code generated by the processor 21 is not limited.

The processor 21 has a function of generating a printed image obtained by adding the generated code to the acquired document.

The processor 21 generates the printed image obtained by adding the code to the document according to the selected template. The processor 21 transmits data of the document and the code to the RIP of the printer 28. The processor 21 transmits information about the size and position of the code to the RIP of the printer 28 according to the selected template. The RIP generates the printed image according to the information from the processor 21.

The processor 21 may generate the printed image without using RIP.

The processor 21 has a function of printing the generated printed image on the paper using the printer 28.

The processor 21 transmits a signal for printing the printed image to the printer 28. The printer 28 prints the printed image generated by the RIP according to the signal. The processor 21 may print the printed image after the input device 26 receives an operation of performing the printing.

Figure 3:
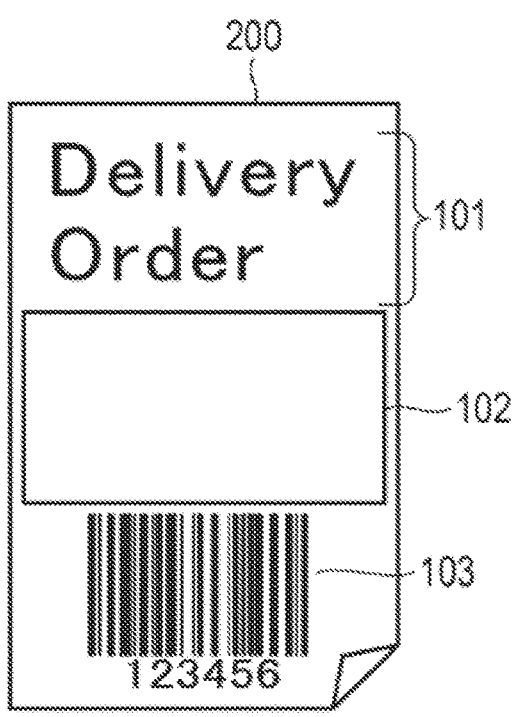
FIG. 3 is a diagram illustrating a service paper according to the embodiment.

FIG. 3 shows an example of the paper on which the image is printed. As shown in FIG. 3, the service paper 200 includes the information field 101, the entry field 102, a code 103, and the like.

The information field 101 and the entry field 102 are as described above.

The code 103 is generated by encoding the identification information by the processor 21. The code 103 is formed to have size and position according to the template. Here, the code 103 is formed under the entry field 102. In this case, the code 103 is the one-dimensional code.

The processor 21 has a function of controlling the scanner 29 to scan the service paper 200 on which the predetermined information is recorded in the entry field 102.

For example, the signature of the consignee is recorded in the entry field 102. In the entry field 102, the signature of the operator who provides the service may be recorded.

The processor 21 controls the scanner 29 to scan the service paper 200. For example, if the input device 26 receives an operation for starting scanning, the processor 21 transmits a signal for starting the scanning to the scanner 29.

The scanner 29 scans the service paper 200 in response to the signal. The scanner 29 transmits the scanned image obtained by scanning the service paper 200 to the processor 21. The processor 21 acquires the scanned image from the scanner 29.

Figure 4:
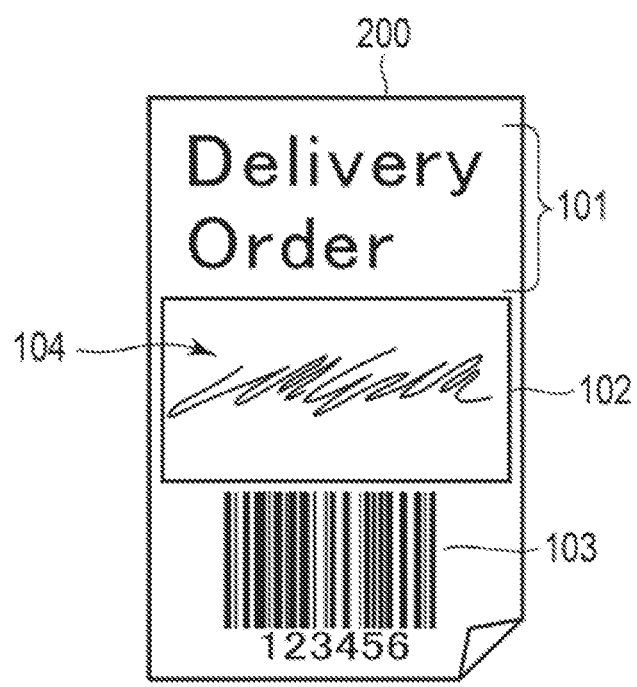
FIG. 4 is a diagram illustrating the service paper according to the embodiment.

FIG. 4 shows an example of the service paper 200 scanned by the scanner 29. As shown in FIG. 4, the service paper 200 includes the information field 101, the entry field 102 and the code 103.

The information field 101 and the code 103 are as described above.

In the entry field 102, a signature 104 is recorded. The signature 104 is recorded by a person relating to the service. For example, the signature 104 is recorded by a consignee or an operator who provides the delivery work.

Other information may be recorded in the entry field 102. The information recorded in the entry field 102 is not limited. For example, the information recorded in the entry field 102 may be a seal, a stamp, a character string or a symbol, or a combination thereof.

The processor 21 has a function of reading the code 103 from the scanned image.

The processor 21 specifies the area of the code 103 from the acquired scanned image. For example, the processor 21 specifies the area of the code 103 using a predetermined object recognition. If the area of the code 103 is specified, the processor 21 decodes the code 103. The processor 21 acquires the identification information obtained by decoding the code 103.

The processor 21 has a function of controlling the communication I/F 25 to transmit the identification information obtained by decoding the code 103 and the image of the entry field 102 in the scanned image to the server 10 in an associated manner.

The processor 21 controls the communication I/F 25 to transmit the identification information obtained by decoding the code 103 and the scanned image to the server 10 in an associated manner. For example, the processor 21 controls the communication I/F 25 to transmit the identification information and the scanned image as one request to the server 10.

The processor 21 may extract the area in which the entry field 102 is recorded from the scanned image. For example, the processor 21 extracts the area in which the entry field 102 is recorded from the scanned image using the predetermined object recognition. The processor 21 may control the communication I/F 25 to transmit the identification information and the image of the extracted area to the server 10 in an associated manner.

Next, functions of the server 10 are described. The functions of the server 10 are performed by the processor 11 executing the programs stored in the ROM 12 or the NVM 14.

First, the processor 11 has a function of acquiring data of the document relating to the service of the task indicated by the identification information acquired by the image forming apparatus 20 to the image forming apparatus 20 through the communication I/F 15.

The processor 11 controls the communication I/F 15 to receive a request for storing the identification information acquired by the image forming apparatus 20 from the image forming apparatus 20. If the request is received, the processor 11 acquires the data of the document relating to the service specified by the identification information stored in the request from the NVM 14. If the data of the document is acquired, the processor 11 controls the communication I/F 15 to transmit a response for storing the document data to the image forming apparatus 20.

If the NVM 14 stores a plurality of types of documents relating to the service, the processor 11 controls the communication I/F 15 to transmit a response including the list of a plurality of types of documents to the image forming apparatus 20. Thereafter, the processor 11 controls the communication I/F 15 to receive a request for transmitting one document type selected from the list from the image forming apparatus 20. The processor 11 controls the communication I/F 15 to transmit the response including the document data to the image forming apparatus 20 in response to the request.

The processor 11 has a function of storing the identification information and the image of the entry field 102 in an associated manner.

The processor 11 controls the communication I/F 15 to receive the identification information and the image of the entry field 102 associated with each other from the image forming apparatus 20. The processor 11 stores the received identification information and image of the entry field 102 in an associated manner in the NVM 14.

Next, an operation example of the management system 1 is described.

First, an operation example in which the management system 1 performs printing on the service paper 200 is described. FIG. 5 is a sequence diagram illustrating an operation example in which the management system 1 performs printing on the service paper 200.

First, the processor 21 of the image forming apparatus 20 acquires the identification information (ACT 11). If the identification information is acquired, the processor 21 controls the communication I/F to transmit the request for storing the identification information to the server 10 (ACT 12).

The processor 11 of the server 10 controls the communication I/F 15 to receive the request. Here, the NVM 14 stores a plurality of types of documents relating to the service specified by the identification information stored in the request.

The processor 11 controls the communication I/F 15 to transmit the response including a list of the document types to the image forming apparatus 20 (ACT 13).

The processor 21 of the image forming apparatus 20 controls the communication I/F 25 to receive the response. If the response is received, the processor 21 selects one of the document types from the list according to the user input through the input device 26 (ACT 14).

If the document type is selected, the processor 21 controls the communication I/F 25 to transmit the request requesting the data of the selected type of the document to the server 10 (ACT 15).

The processor 11 of the server 10 controls the communication I/F 15 to receive the request. If the request is received, the processor 11 of the server 10 controls the communication I/F 15 to transmit the response including the data of the document to the image forming apparatus 20 in response to the request (ACT 16).

The processor 21 of the image forming apparatus 20 controls the communication I/F 25 to receive the response. If the response is received, the processor 21 generates a preview image based on the document data stored in the response (ACT 17). Here, the NVM 24 stores a plurality of templates.

If the preview image is generated, the processor 21 controls the display 27 to display the preview image (ACT 18).

If the preview image is displayed, the processor 21 selects a template according to the user input through the input device (ACT 19). If the template is selected, the processor 21 encodes the identification information (ACT 20).

If the identification information is encoded, the processor 21 generates a printed image including the encoded code using the RIP according to the selected template (ACT 21). If the printed image is generated, the processor 21 controls the display 27 to display the printed image as the preview image (ACT 22).

If the printed image is displayed on the display 27 as the preview image, the processor 21 transmits a signal for printing the printed image to the printer 28 (ACT 23).

The printer 28 receives the signal. If the signal is received, the printer 28 prints the printed image on the paper (ACT 24). If the printer 28 prints the printed image on the paper, the management system 1 terminates the operation.

The processor 21 may proceed to the processing in ACT 23 after the input device 26 receives the operation for performing printing after ACT 22.

Next, an operation example in which the management system 1 stores the image of the entry field 102 is described. FIG. 6 is a sequence diagram illustrating an operation example in which the management system 1 stores the image of the entry field 102.

Here, the predetermined information such as the signature 104 is recorded in the entry field 102 of the service paper 200. Furthermore, the operator sets the service paper 200 in the scanner 29.

First, the processor 21 of the image forming apparatus 20 transmits a signal for starting scanning to the scanner 29 (ACT 31).

The scanner 29 receives the signal. If the signal is received, the scanner 29 scans the service paper 200 to obtain a scanned image (ACT 32). If the scanned image is obtained, the scanner 29 transmits the scanned image to the processor 21 (ACT 33).

The processor 21 acquires the scanned image from the scanner 29. If the scanned image is acquired, the processor 21 decodes the code 103 in the scanned image to obtain the identification information (ACT 34).

If the identification information is obtained, the processor 21 controls the communication I/F 25 to transmit the obtained identification information and the image of the entry field 102 in the scanned image in an associated manner to the server 10 (ACT 35).

The processor 11 of the server 10 controls the communication I/F 15 to receive the identification information and the image of the entry field 102 associated with each other from the image forming apparatus 20. If the identification information and the image of the entry field 102 are received from the image forming apparatus 20, the processor 11 stores the received identification information and the image of the entry field 102 in the NVM 14 in an associated manner (ACT 36).

If the processor 11 stores the identification information and the image of the entry field 102 in the NVM 14 in an associated manner, the management system 1 terminates the operation.

The processor 21 of the image forming apparatus 20 does not have to decode the code 103 in the scanned image. In this case, the processor 21 controls the communication I/F 25 to transmit the scanned image to the server 10. The processor 11 of the server 10 decodes the received code 103 in the scanned image to obtain the identification information. The processor 11 stores the obtained identification information and the image of the entry field 102 in the scanned image in the NVM 14 in an associated manner.

The processor 21 of the image forming apparatus 20 may store the identification information obtained by decoding the code 103 and the image of the entry field 102 in the scanned image in the NVM 24 in an associated manner.

The NVM 24 may store data of the document. In this case, the processor 21 of the image forming apparatus 20 obtains the document data relating to the service specified by the acquired identification information from the NVM 24.

The image forming apparatus configured as described above acquires the identification information indicating a predetermined task in the predetermined service. The image forming apparatus generates the code by encoding the identification information. The image forming apparatus adds the code to the document used in the service to print them. As a result, the image forming apparatus can add the code indicating the task of the service to the document relating to a predetermined service to print them.

The image forming apparatus scans the paper on which the information relating to the task specified by the identification information is recorded in the entry field. The image forming apparatus decodes the code on the paper to obtain the identification information. The image forming apparatus obtains the image of the entry field on the paper. As a result, the image forming apparatus can associate the identification information with the image of the information relating to the task specified by the identification information.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus comprising:
a display;
an input device; and
a processor configured to:
accept, through the input device, a user input of identification information about a package for delivery,
acquire information about a plurality of document types used in a delivery service, generate a screen displayed on the display, the screen showing a preview of a print image for each of the document types, upon selection of a previewed print image, encode the identification information into a code, and output the selected print image together with the code for printing, wherein the previewed print image includes a signature field and a code field in which the code is to be printed.

2. The image processing apparatus according to claim 1, wherein the selected print image and the code are output to a printer.

3. The image processing apparatus according to claim 1, further comprising:

a communication interface configured to communicate with an external device from which the information about the document types is acquired.

4. The image processing apparatus according to claim 1, wherein the previewed print image further includes an information field for indicating the delivery service.

5. The image processing apparatus according to claim 1, further comprising:

a memory that stores code information for encoding the identification information.

6. The image processing apparatus according to claim 5, wherein the code information indicates a plurality of encoding schemes, and the processor encodes the identification information based on one of the encoding schemes selected through the input device.

7. The image processing apparatus according to claim 1, wherein the code is either a one-dimensional code or a two-dimensional code.

8. The image processing apparatus according to claim 1, further comprising:

a scanner, wherein the processor is further configured to control the scanner to acquire an image of a sheet on which a code is printed, and decode the code.

9. The image processing apparatus according to claim 8, further comprising:

a communication interface configured to communicate with an external device, wherein the processor is configured to acquire identification information from the decoded code, and control the communication interface to transmit to the external device a part of the image of the sheet according to the acquired identification information.

10. A method performed by an image processing apparatus, the method comprising:

accepting a user input of identification information about a package for delivery;

acquiring information about a plurality of document types used in a delivery service;

displaying a preview of a print image for each of the document types;

upon selection of a previewed print image, encoding the identification information into a code; and outputting the selected print image together with the code for printing, wherein the previewed print image includes a signature field and a code field in which the code is to be printed.

11. The method according to claim 10, wherein the selected print image and the code are output to a printer.

12. The method according to claim 10, wherein the information about each of the document types is acquired from an external device.

13. The method according to claim 10, wherein the previewed print image further includes an information field for indicating the delivery service.

14. The method according to claim 10, further comprising:

storing code information for encoding the identification information.

15. The method according to claim 14, wherein the code information indicates a plurality of encoding schemes, and the identification information is encoded based on one of the encoding schemes selected through an input device.

16. The method according to claim 10, wherein the code is either a one-dimensional code or a two-dimensional code.

17. The method according to claim 10, further comprising:

acquiring an image of a sheet on which a code is printed and decoding the code.

18. The method according to claim 17, further comprising:

acquiring identification information from the decoded code; and transmitting to an external device a part of the image of the sheet according to the acquired identification information.

19. A non-transitory computer readable medium storing a program causing a computer to execute a method comprising:

accepting a user input of identification information about a package for delivery;

acquiring information about a plurality of document types used in a delivery service;

displaying a preview of a print image for each of the document types;

upon selection of a previewed print image, encoding the identification information into a code; and outputting the selected print image together with the code for printing, wherein the previewed print image includes a signature field and a code field in which the code is to be printed.

* * * * *